United States Patent
Smith

(10) Patent No.: US 11,339,039 B1
(45) Date of Patent: May 24, 2022

(54) WHEEL LIFT FOR CHANGING TIRES ON A VEHICLE

(71) Applicant: Alfred Smith, Rubonia, FL (US)

(72) Inventor: Alfred Smith, Rubonia, FL (US)

( * ) Notice: Subject to any disclaimer, the term of this patent is extended or adjusted under 35 U.S.C. 154(b) by 3 days.

(21) Appl. No.: 16/922,019

(22) Filed: Jul. 7, 2020

(51) Int. Cl.
*B66F 5/04* (2006.01)

(52) U.S. Cl.
CPC ..................... *B66F 5/04* (2013.01)

(58) Field of Classification Search
None
See application file for complete search history.

(56) References Cited

U.S. PATENT DOCUMENTS

| | | | |
|---|---|---|---|
| 4,555,089 A | 11/1985 | Eck | |
| 4,771,531 A | 9/1988 | Asher | |
| 5,215,287 A * | 6/1993 | Leski | B66F 3/22 254/122 |
| D357,106 S | 4/1995 | Francis | |
| 5,503,368 A * | 4/1996 | Torres | B66F 7/0608 254/122 |
| 6,098,961 A * | 8/2000 | Gionet | B66F 7/065 254/122 |
| 7,334,804 B2 | 2/2008 | Mitchell | |
| 10,035,688 B1 * | 7/2018 | Robinson | B60B 30/04 |
| 10,226,964 B2 | 3/2019 | Rucchetto | |
| 10,336,591 B1 * | 7/2019 | McLean | B66F 5/025 |
| 2015/0290972 A1 | 10/2015 | Minor | |
| 2016/0325586 A1 | 11/2016 | Mathieson | |
| 2019/0010034 A1 | 1/2019 | Edwards, Sr. | |

FOREIGN PATENT DOCUMENTS

WO 2013059304 4/2013

* cited by examiner

*Primary Examiner* — Tyrone V Hall, Jr.
(74) *Attorney, Agent, or Firm* — Kyle A. Fletcher, Esq.

(57) ABSTRACT

The wheel lift for changing tire on a vehicle (hereinafter wheel lift) is a mechanical structure. The wheel lift forms a jack used to elevate a vehicle such that the wheel of the vehicle can be removed and replaced. The wheel lift is a portable structure. The wheel lift is a rolling structure. The wheel lift is a non-Euclidean structure such that the wheel targeted for replacement can roll onto the wheel lift. The wheel lift comprises a pedestal, a jack structure, and a wheel rack. The jack structure attaches the wheel rack to the pedestal. The span of the length of the jack structure in the vertical direction adjusts such that the jack structure controls the elevation of the wheel rack above the supporting surface. The wheel rack receives and supports the wheel targeted for replacement.

17 Claims, 6 Drawing Sheets

WHEEL LIFT FOR CHANGING TIRES ON A VEHICLE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of transportation, vehicles, and wheels for vehicles, more specifically, an apparatus and tools for mounting and dismounting tires. (B60B29/001)

SUMMARY OF INVENTION

The wheel lift for changing tire on a vehicle is a mechanical structure. The wheel lift for changing tire on a vehicle forms a jack used to elevate a vehicle such that a wheel of the vehicle can be removed and replaced. The wheel lift for changing tire on a vehicle is a portable structure. The wheel lift for changing tire on a vehicle is a rolling structure. The wheel lift for changing tire on a vehicle is a non-Euclidean structure such that the wheel targeted for replacement can roll onto the wheel lift for changing tire on a vehicle. The wheel lift for changing tire on a vehicle comprises a pedestal, a jack structure, and a wheel rack. The jack structure attaches the wheel rack to the pedestal. The span of the length of the jack structure in the vertical direction adjusts such that the jack structure controls the elevation of the wheel rack above the supporting surface. The wheel rack receives and supports the wheel targeted for replacement.

These together with additional objects, features and advantages of the wheel lift for changing tire on a vehicle will be readily apparent to those of ordinary skill in the art upon reading the following detailed description of the presently preferred, but nonetheless illustrative, embodiments when taken in conjunction with the accompanying drawings.

In this respect, before explaining the current embodiments of the wheel lift for changing tire on a vehicle in detail, it is to be understood that the wheel lift for changing tire on a vehicle is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the wheel lift for changing tire on a vehicle.

It is therefore important that the claims be regarded as including such equivalent construction insofar as they do not depart from the spirit and scope of the wheel lift for changing tire on a vehicle. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
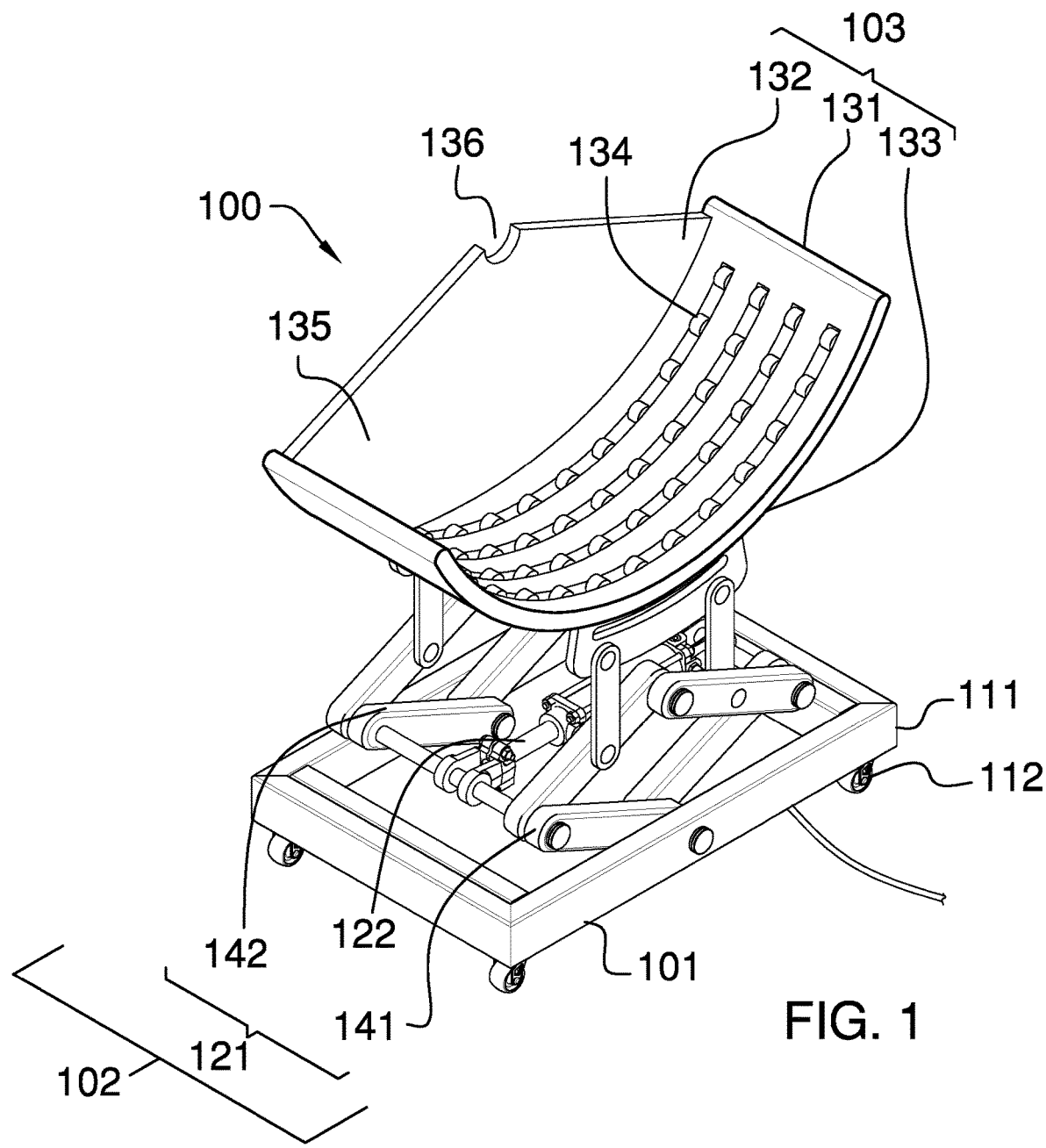
FIG. 1 is a perspective view of an embodiment of the disclosure.
Figure 2:
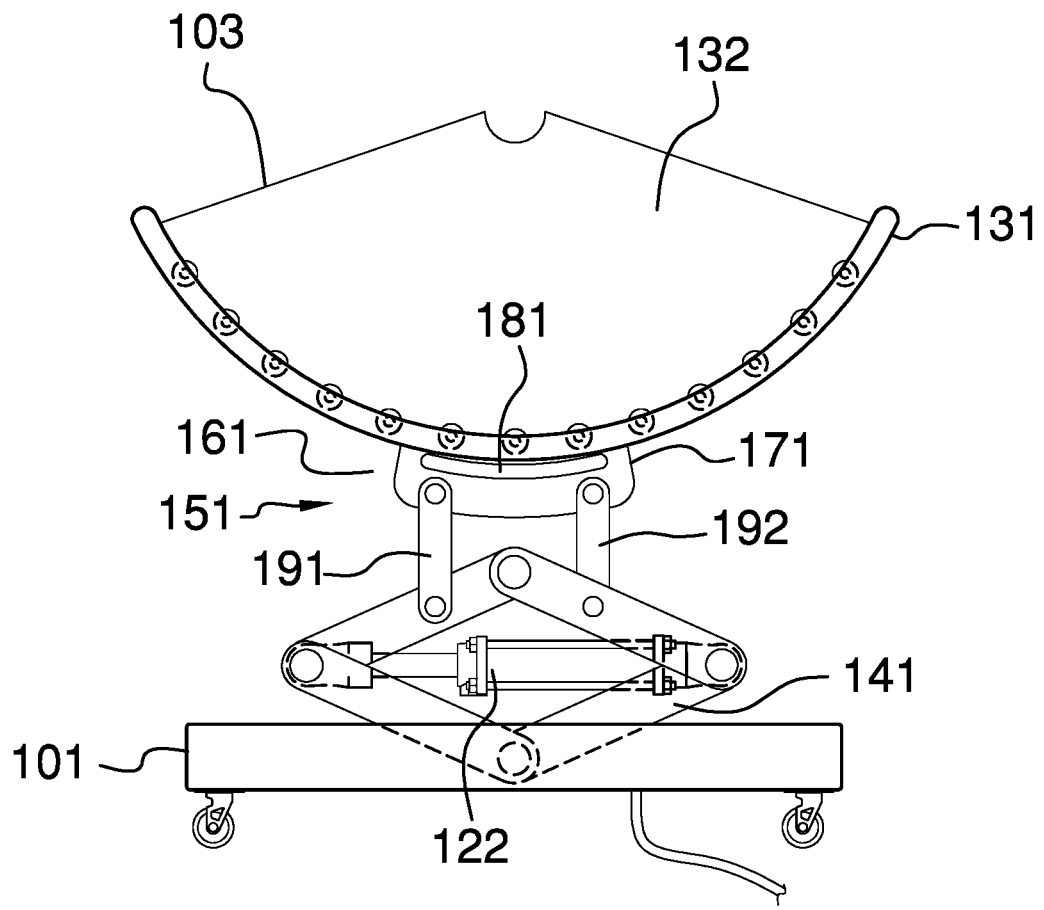
FIG. 2 is a front view of an embodiment of the disclosure.
Figure 3:
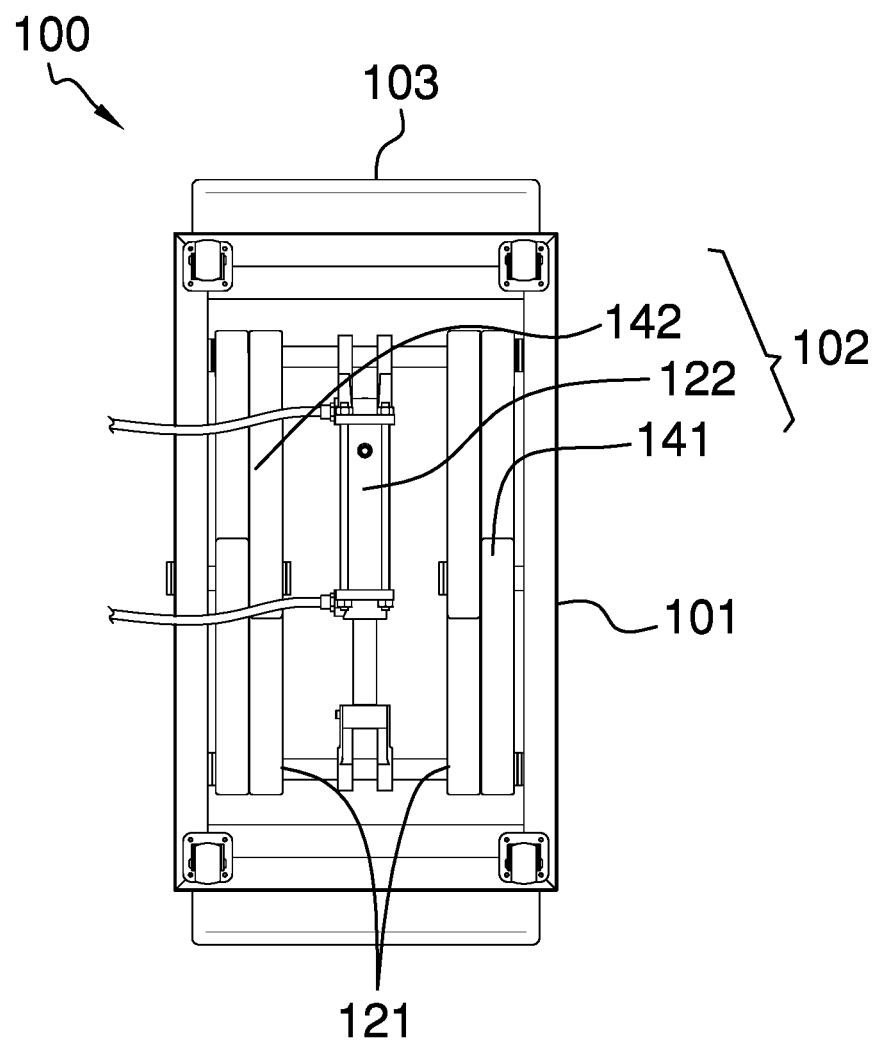
FIG. 3 is a bottom view of an embodiment of the disclosure.
Figure 4:
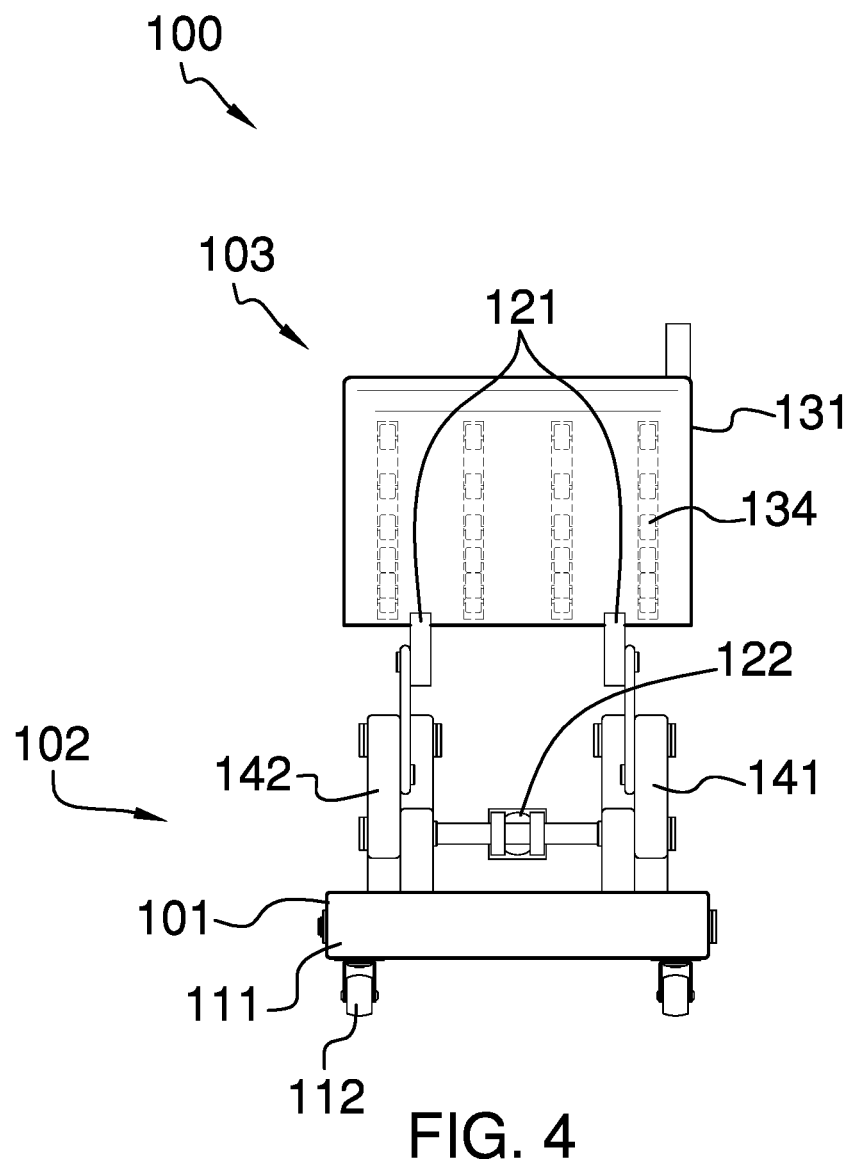
FIG. 4 is a side view of an embodiment of the disclosure.
Figure 5:
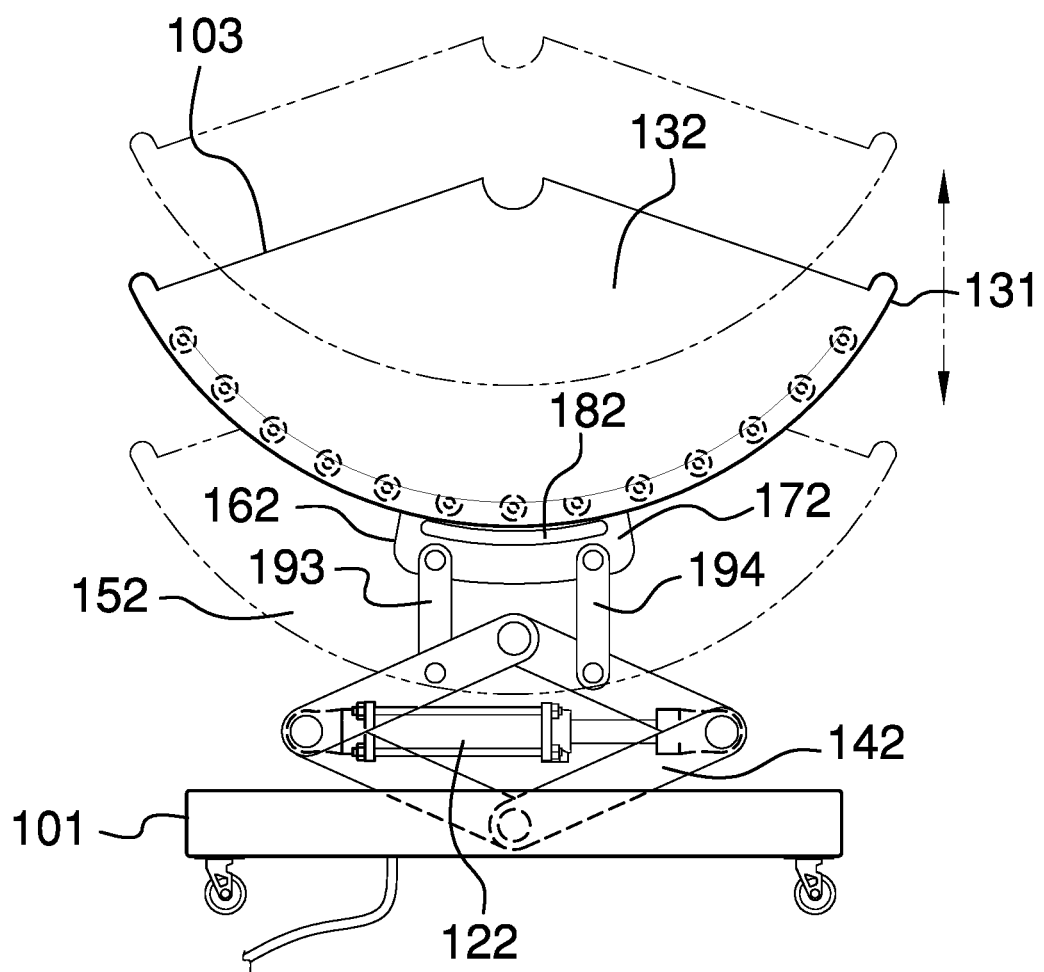
FIG. 5 is a rear view of an embodiment of the disclosure.

Detailed reference will now be made to one or more potential embodiments of the disclosure, which are illustrated in FIGS. 1 through 5.

The wheel lift for changing tire on a vehicle 100 (hereinafter invention) is a mechanical structure. The invention 100 is configured for use with a vehicle 104. The vehicle 104 further comprises a wheel 105. The invention 100 forms a jack used to elevate the vehicle 104 such that the wheel 105 of the vehicle 104 can be removed and replaced. The invention 100 is a portable structure. The invention 100 is a rolling structure. The invention 100 is a non-Euclidean structure such that the wheel 105 targeted for replacement can roll onto the invention 100. The invention 100 comprises a pedestal 101, a jack structure 102, and a wheel 105 rack 103. The jack structure 102 attaches the wheel 105 rack 103 to the pedestal 101. The span of the length of the jack structure 102 in the vertical direction adjusts such that the jack structure 102 controls the elevation of the wheel 105 rack 103 above the supporting surface. The wheel 105 rack 103 receives and supports the wheel 105 targeted for replacement.

The vehicle 104 is defined elsewhere in this disclosure. The wheel 105 is a disk-shaped structure. The wheel 105 is defined elsewhere in this disclosure.

The pedestal 101 is a mechanical structure. The pedestal 101 is a rolling structure. The pedestal 101 provides a gripping structure that allows the invention 100 to be lifted and carried. The pedestal 101 forms the inferior structure of the invention 100. The pedestal 101 forms the final link of the load path the transfers the load of the invention 100 and the vehicle 104 to a supporting surface. The pedestal 101 comprises a pedestal 101 frame 111 and a plurality of pedestal 101 casters 112.

The pedestal 101 frame 111 is a mechanical structure. The pedestal 101 frame 111 is a rigid structure. The pedestal 101 frame 111 has a disk shape. The pedestal 101 frame 111 has a ring structure. The perimeter of the pedestal 101 frame 111 forms a grip used to carry and manipulate the invention 100.

Each of the plurality of pedestal 101 casters 112 is a rolling structure. Each of the plurality of pedestal 101 casters 112 attaches to the inferior congruent end of the disk structure of the pedestal 101 frame 111. Each of the plurality of pedestal 101 casters 112 attaches to the pedestal 101 frame 111 such that the pedestal 101 will roll freely over a supporting surface into its operating position. Each of the plurality of pedestal 101 casters 112 is a locking structure. The locking structure of each of the plurality of pedestal 101 casters 112 allows the pedestal 101 to be fixed into a set position on the supporting surface.

The jack structure 102 is a mechanical structure. The jack structure 102 forms a jack that elevates the wheel 105 of the vehicle 104 above the supporting surface. The jack structure 102 forms a load path that transfers the load of the wheel 105 rack 103 and the vehicle 104 to a supporting surface. The jack structure 102 comprises a double scissor jack 121 and a spacing structure 122.

The double scissor jack 121 is a mechanical structure. The scissor jack and the double scissor jack 121 are defined elsewhere in this disclosure. The double scissor jack 121 forms the framework that attaches the wheel 105 rack 103 to the pedestal 101. The double scissor jack 121 is a rotating structure. The double scissor jack 121 rotates such that the elevation of the wheel 105 rack 103 relative to the pedestal 101 is adjustable. The double scissor jack 121 adjusts the span of the length of the elevation of wheel 105 rack 103 relative to the pedestal 101 by rotating the positions of the elements of the double scissor jack 121 relative to each other. The double scissor jack 121 comprises a first scissor jack 141 and a second scissor jack 142.

The first scissor jack 141 is a mechanical structure known as a scissor jack. The scissor jack is defined in detail elsewhere in this disclosure. The first scissor jack 141 forms a portion of the load path formed by the double scissor jack 121. The first scissor jack 141 physically raises and lowers the elevation of the wheel 105 rack 103 relative to the pedestal 101. The first scissor jack 141 physically attaches to the spacing structure 122 such that a change in the span of the length of the spacing structure 122 changes the elevation provided by the first scissor jack 141.

The second scissor jack 142 is a mechanical structure known as a scissor jack. The scissor jack is defined in detail elsewhere in this disclosure. The second scissor jack 142 forms a portion of the load path formed by the double scissor jack 121. The second scissor jack 142 physically raises and lowers the elevation of the wheel 105 rack 103 relative to the pedestal 101. The second scissor jack 142 physically attaches to the spacing structure 122 such that a change in the span of the length of the spacing structure 122 changes the elevation provided by the second scissor jack 142.

The first scissor jack 141 is identical to the second scissor jack 142. The first scissor jack 141 and the second scissor jack 142 combine to form the double scissor jack 121. The first scissor jack 141 attaches to the wheel 105 disk 131 of the wheel 105 rack 103 such that the wheel 105 disk 131 rotates relative to the first scissor jack 141. The second scissor jack 142 attaches to the wheel 105 disk 131 of the wheel 105 rack 103 such that the wheel 105 disk 131 rotates relative to the second scissor jack 142.

The spacing structure 122 is a mechanical structure. The spacing structure 122 is defined elsewhere in this disclosure. The spacing structure 122 attaches to the double scissor jack 121. The spacing structure 122 adjusts the elevation of the double scissor jack 121. The spacing structure 122 rotates the rotating elements of the double scissor jack 121 relative to each other to adjust the elevation of the double scissor jack 121. In the first potential embodiment of the disclosure, the spacing structure 122 is a hydraulic cylinder. The hydraulic cylinder is a mechanical structure with a variable length. The motive forces of the hydraulic cylinder are provided by a pressurized fluid. The span of the length of the hydraulic cylinder is a function of the pressure of the fluid in the hydraulic cylinder. The elevation of the double scissor jack 121 adjusts by adjusting the length of the hydraulic cylinder that forms the spacing structure 122.

The wheel 105 rack 103 is a mechanical structure. The wheel 105 rack 103 has a prism shape. The wheel 105 rack 103 is formed as a semi-enclosed prism structure. The wheel 105 rack 103 is formed as a semi-enclosed pan structure. The wheel 105 rack 103 comprises a wheel 105 disk 131, an axle plate 132, and a mounting structure 133.

The wheel 105 disk 131 is a non-Euclidean disk structure. The non-Euclidean disk structure of the wheel 105 disk 131 is formed with a concave congruent end and a convex congruent end. The wheel 105 disk 131 is formed as a portion of the lateral face of the prism structure of the wheel 105 rack 103. The shape of the concave congruent end of the non-Euclidean disk structure of the wheel 105 disk 131 is geometrically similar to the wheel 105 such that the wheel 105 will roll into and fit in the containment structure formed by the wheel 105 disk 131. The wheel 105 disk 131 forms the structure that elevates the wheel 105 above the supporting surface.

The wheel 105 rack 103 attaches to the double scissor jack 121 by attaching the wheel 105 disk 131 to the double scissor jack 121. The wheel 105 disk 131 attaches to the double scissor jack 121 such that the wheel 105 disk 131 rotates relative to the double scissor jack 121.

The wheel 105 disk 131 further comprises a plurality of rollers 134. Each of the plurality of rollers 134 is a rotating structure. Each of the plurality of rollers 134 installs in the concave surface of the wheel 105 disk 131. Each of the plurality of rollers 134 installs in the concave surface of the wheel 105 disk 131 such that the axis of rotation of each roller is parallel to the center axis of the disk structure of the wheel 105 rack 103. Stated differently, the axis of rotation of each of the plurality of rollers 134 is perpendicular to the congruent end of the irregular prism structure of the axle plate 132. The plurality of rollers 134 forms an interface between the wheel 105 disk 131 and the wheel 105 such that the wheel 105 disk 131 will rotate around the wheel 105 as the wheel 105 disk 131 rotates relative to the double scissor jack 121.

The axle plate 132 is a rigid structure. The axle plate 132 forms a congruent end of the disk structure of the wheel 105 rack 103. The axle plate 132 forms the closed face of the semi-enclosed pan structure formed by the wheel 105 rack 103. The axle plate 132 has an irregular prism shape. The axle plate 132 rigidly attaches to the wheel 105 disk 131 such that the congruent ends of the irregular prism structure of the axle plate 132 are perpendicular to the congruent ends of the non-Euclidean disk structure of the wheel 105 disk 131. The congruent ends of the irregular prism structure of the axle plate 132 are parallel to the force of gravity.

The axle plate 132 forms a vertically oriented boundary that guides the wheel 105 onto the concave congruent end of the non-Euclidean disk structure of the wheel 105 disk 131. The axle plate 132 forms a mechanical structure that supports the axle associated with the wheel 105 such that the load of the vehicle 104 transfers into the invention 100 through the axle plate 132 as the wheel 105 is installed onto or removed from the vehicle 104.

The axle plate 132 further comprises an axle disk 135 and an axle notch 136. The axle disk 135 forms the physical instantiation of the wheel 105 disk 131. The axle disk 135 is a rigid plate structure. The axle disk 135 has an irregular prism shape. The axle disk 135 forms a disk structure. The axle disk 135 is constructed to bear the load of the vehicle 104 when the wheel 105 of the vehicle 104 is installed onto or removed from the vehicle 104. The axle notch 136 is a negative space that is formed into the superior lateral face of the prism irregular structure of the axle disk 135. The axle notch 136 is sized to receive the axle associated with the wheel 105 of the vehicle 104. The axle notch 136 is the structure that physically receives the load of the vehicle 104 while the wheel 105 of the vehicle 104 is installed onto or removed from the vehicle 104.

The mounting structure 133 is a mechanical structure. The mounting structure 133 is a fastening structure. The mounting structure 133 attaches the wheel 105 disk 131 of the wheel 105 rack 103 to the superior end of the double scissor jack 121 jack structure 102. The mounting structure 133 attaches the wheel 105 disk 131 to the double scissor jack 121 such that the wheel 105 disk 131 rotates relative to the double scissor jack 121. The mounting structure 133 comprises a first jack mount 151 and a second jack mount 152.

The first jack mount 151 is a mechanical structure. The first jack mount 151 attaches the superior end of the first scissor jack 141 to the convex congruent end of the wheel 105 disk 131. The first jack mount 151 attaches the superior end of the first scissor jack 141 to the wheel 105 disk 131 such that the wheel 105 disk 131 rotates relative to the first scissor jack 141. The first jack mount 151 comprises a first slotted plate 161, a first pivot bar 191, and a second pivot bar 192.

The first slotted plate 161 is an irregular prism-shaped structure. The slotted plate is defined elsewhere in this disclosure. The first slotted plate 161 has a disk structure. The first slotted plate 161 attaches to the convex congruent end of the non-Euclidean disk structure of the wheel 105 disk 131. The first slotted plate 161 attaches to the wheel 105 disk 131 such that the congruent ends of the irregular disk structure of the first slotted plate 161 are perpendicular to the convex congruent end of the non-Euclidean disk structure of the wheel 105 disk 131. A portion of the lateral face of the disk structure of the first slotted plate 161 is geometrically similar to the convex congruent end of the non-Euclidean disk structure of the wheel 105 disk 131 such that the first slotted plate 161 mounts flush against the wheel 105 disk 131. The first slotted plate 161 comprises a first irregular disk structure 171 and a first non-Euclidean slot structure 181.

The first irregular disk structure 171 refers to the physical plate that forms the disk structure of the first slotted plate 161. The lateral face of the first irregular disk structure 171 physically attaches to the convex congruent end of the wheel 105 disk 131. The first non-Euclidean slot structure 181 refers to the negative space that is formed through the congruent ends of the disk structure of the first irregular disk structure 171 that forms the disk-shaped negative space through the first irregular disk structure 171 that is characteristic of a slotted plate. The first irregular disk structure 171 attaches to the wheel 105 disk 131 such that the position of the first irregular disk structure 171 relative to the wheel 105 disk 131 adjusts as the wheel 105 disk 131 rotates relative to the first scissor jack 141.

The first pivot bar 191 is a rigid disk-shaped structure. The first pivot bar 191 attaches the superior end of the first scissor jack 141 to the first irregular disk structure 171 of the first slotted plate 161. The first pivot bar 191 attaches to the superior end of the first scissor jack 141 such that the first pivot bar 191 rotates relative to the first scissor jack 141. The first pivot bar 191 attaches to the first irregular disk structure 171 such that the first pivot bar 191 rotates relative to the first irregular disk structure 171.

The second pivot bar 192 is a rigid disk-shaped structure. The second pivot bar 192 attaches the superior end of the first scissor jack 141 to the convex congruent end of the non-Euclidean disk structure of the wheel 105 disk 131 of the wheel 105 rack 103. The second pivot bar 192 attaches to the superior end of the first scissor jack 141 such that the second pivot bar 192 rotates relative to the first scissor jack 141. The second pivot bar 192 attaches to the convex congruent end of the non-Euclidean disk structure of the wheel 105 disk 131 such that the second pivot bar 192 rotates relative to the wheel 105 disk 131.

The second jack mount 152 is a mechanical structure. The second jack mount 152 attaches the superior end of the second scissor jack 142 to the convex congruent end of the wheel 105 disk 131. The second jack mount 152 attaches the superior end of the second scissor jack 142 to the wheel 105 disk 131 such that the wheel 105 disk 131 rotates relative to the second scissor jack 142. The second jack mount 152 comprises a second slotted plate 162, a third pivot bar 193, and a fourth pivot bar 194.

The second slotted plate 162 is an irregular prism-shaped structure. The slotted plate is defined elsewhere in this disclosure. The second slotted plate 162 has a disk structure. The second slotted plate 162 attaches to the convex congruent end of the non-Euclidean disk structure of the wheel 105 disk 131. The second slotted plate 162 attaches to the wheel 105 disk 131 such that the congruent ends of the irregular disk structure of the second slotted plate 162 are perpendicular to the convex congruent end of the non-Euclidean disk structure of the wheel 105 disk 131. A portion of the lateral face of the disk structure of the second slotted plate 162 is geometrically similar to the convex congruent end of the non-Euclidean disk structure of the wheel 105 disk 131 such that the second slotted plate 162 mounts flush against the wheel 105 disk 131. The second slotted plate 162 comprises a second irregular disk structure 172 and a second non-Euclidean slot structure 182.

The second irregular disk structure 172 refers to the physical plate that forms the disk structure of the second slotted plate 162. The lateral face of the second irregular disk structure 172 physically attaches to the convex congruent end of the wheel 105 disk 131. The second non-Euclidean slot structure 182 refers to the negative space that is formed through the congruent ends of the disk structure of the second irregular disk structure 172 that forms the disk-shaped negative space through the second irregular disk structure 172 that is characteristic of a slotted plate. The second irregular disk structure 172 attaches to the wheel 105 disk 131 such that the position of the second irregular disk structure 172 relative to the wheel 105 disk 131 adjusts as the wheel 105 disk 131 rotates relative to the second scissor jack 142.

The third pivot bar 193 is a rigid disk-shaped structure. The third pivot bar 193 attaches the superior end of the second scissor jack 142 to the second irregular disk structure 172 of the second slotted plate 162. The third pivot bar 193 attaches to the superior end of the second scissor jack 142 such that the third pivot bar 193 rotates relative to the second scissor jack 142. The third pivot bar 193 attaches to the second irregular disk structure 172 such that the third pivot bar 193 rotates relative to the second irregular disk structure 172.

The fourth pivot bar 194 is a rigid disk-shaped structure. The fourth pivot bar 194 attaches the superior end of the second scissor jack 142 to the convex congruent end of the non-Euclidean disk structure of the wheel 105 disk 131 of the wheel rack 103. The fourth pivot bar 194 attaches to the superior end of the second scissor jack 142 such that the fourth pivot bar 194 rotates relative to the second scissor jack 142. The fourth pivot bar 194 attaches to the convex congruent end of the non-Euclidean disk structure of the wheel 105 disk 131 such that the fourth pivot bar 194 rotates relative to the wheel 105 disk 131.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Arcuate: As used in this disclosure, arcuate describes the curve formed by a bent bow.

Axle: As used in this disclosure, an axle is a cylindrical shaft that is inserted through the center of one or more wheels such that the axis of rotation of the one or more wheels and the center axis of the axle are aligned.

Caster: As used in this disclosure, a caster is a wheel that is mounted on a swivel that allows the wheel to adjust, or swivel, the direction of rotation of the wheel to the direction of motion desired for the wheel. The generic parts of a caster are called the stem, the swivel bearing, the swivel mount, and the wheel. The swivel bearing attaches the stem to the swivel mount such that the swivel mount will rotate relative to the stem. The wheel attaches to the swivel mount such that the wheel freely rotates relative to the swivel mount. The direction of the axis of rotation of the wheel is perpendicular to the direction of the axis of rotation of the swivel mount. The stem attaches the swivel bearing, the swivel mount, and the wheel to an externally provided object.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Center of Rotation: As used in this disclosure, the center of rotation is the point of a rotating plane that does not move with the rotation of the plane. A line within a rotating three-dimensional object that does not move with the rotation of the object is also referred to as an axis of rotation.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Concave: As used in this disclosure, concave is used to describe: 1) a surface that resembles the interior surface of a sphere; or, 2) a function with a curvature structure wherein a chord that connects any two points of the function will be lesser than (graphically below) or equal to the value of the function at any point along the chord.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Convex: As used in this disclosure, convex is used to describe: 1) a surface that resembles the outer surface of a sphere; or, 2) a function with a curvature structure wherein a chord that connects any two points of the function will be greater than (graphically above) or equal to the value of the function at any point along the chord.

Correspond: As used in this disclosure, the term correspond is used as a comparison between two or more objects wherein one or more properties shared by the two or more objects match, agree, or align within acceptable manufacturing tolerances.

Curve or Curvature: As used in this disclosure, a curve refers to a continuous line that is not a straight line or a continuous surface that is not a planar surface. By continuous is meant that the continuous line or surface changes smoothly over one or more independent variables. Alternately, continuous can be taken to mean that a single valued derivative with respect to any independent variable exists for all points on the curved line or curved surface. A note on usage: within this disclosure, when a prism is said to be curved, what will be meant is that the center axis of the prism is curved. The discontinuities inherent in the ends of the prism will continue to exist in the lateral face of the curved prism.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Ellipse: As used in this disclosure, an ellipse is a curve described by the equation $(x/a)^2+(y/b)^2=c$.

Extension Structure: As used in this disclosure, an extension structure is an inert physical structure that is used to extend or bridge the reach between any two objects.

Flush: As used in this disclosure, the term flush is used to describe the alignment of a first surface and a second surface to form a single structure selected from the group consisting of a Euclidean plane and a non-Euclidean plane.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Grip: As used in this disclosure, a grip is an accommodation formed on or within an object that allows the object to be grasped or manipulated by a hand.

Hydraulic: As used in this disclosure, hydraulic refers to a device wherein the movement of the device is powered using a fluid under pressure.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Hydraulic: As used in this disclosure, hydraulic refers to a device wherein the movement of the device is powered using a fluid under pressure. The terms pneumatic and hydraulic can be used interchangeably.

Hydraulic Cylinder: As used in this disclosure, a Hydraulic cylinder is a telescopic composite prism structure. The telescopic nature of the hydraulic cylinder allows the span of the length of the composite prism structure of the hydraulic cylinder to be adjusted. The span of the length of the composite prism structure of the hydraulic cylinder is controlled by controlling the fluid pressure within the hydraulic cylinder.

Inferior: As used in this disclosure, the term inferior refers to a directional reference that is parallel to and in the same direction as the force of gravity when an object is positioned or used normally.

Instantiation: As used in this disclosure, an instantiation refers to a specific physical object or process that is created using a specification.

Jack: As used in this disclosure, a jack is a mechanical device for lifting heavy loads by means of a force applied with a lever, screw, or hydraulic press. A jack is also called a lift.

Lateral Prism Structure: As used in this disclosure, a lateral prism structure refers to the juxtaposition of a first lateral face of a first prism structure to a second lateral face of a second prism structure such that: a) the center axes of the first prism and the second prism are parallel; and, b) the congruent ends of the first prism are parallel to the congruent ends of the second prism. The span of the length of the center axes of the first prism and the second prism need not be equal. The form factor of the congruent ends of the first prism and the second prism need not be geometrically similar.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Loop: As used in this disclosure, a loop is the length of a first linear structure including, but not limited to, shafts, lines, cords, or webbings, that is: 1) folded over and joined at the ends forming an enclosed space; or, 2) curved to form a closed or nearly closed space within the first linear structure. In both cases, the space formed within the first linear structure is such that a second linear structure such as a line, cord or a hook can be inserted through the space formed within the first linear structure. Within this disclosure, the first linear structure is said to be looped around the second linear structure.

Negative Space: As used in this disclosure, negative space is a method of defining an object through the use of open or empty space as the definition of the object itself, or, through the use of open or empty space to describe the boundaries of an object.

Non-Euclidean Disk: As used in this disclosure, a non-Euclidean structure is a disk-shaped structure wherein the congruent end (faces) of the disk structure lies on a non-Euclidean plane.

Non-Euclidean Prism: As used in this disclosure, a non-Euclidean prism is a prism structure wherein the center axis of the prism lies on a non-Euclidean plane or is otherwise formed with a curvature.

Not Significantly Different: As used in this disclosure, the term not significantly different compares a specified property of a first object to the corresponding property of a reference object (reference property). The specified property is considered to be not significantly different from the reference property when the absolute value of the difference between the specified property and the reference property is less than 10.0% of the reference property value. A negligible difference is considered to be not significantly different.

Notch: As used in this disclosure, a notch is: 1) an indentation formed in an edge; or 2) a cavity or aperture formed within a surface.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of the prism structure of the pan and/or a portion of the closed lateral faces of the pan are open.

Perimeter: As used in this disclosure, a perimeter is one or more curved or straight lines that bounds an enclosed area on a plane or surface. The perimeter of a circle is commonly referred to as a circumference.

Pivot: As used in this disclosure, a pivot is a rod or shaft around which an object rotates or swings.

Pneumatic: As used in this disclosure, pneumatic refers to a device wherein the movement of the device is powered or controlled using a fluid under pressure.

Pneumatic Cylinder: As used in this disclosure, a pneumatic cylinder is a telescopic composite prism structure. The telescopic nature of the pneumatic cylinder allows the span of the length of the composite prism structure of the pneumatic cylinder to be adjusted. The span of the length of the composite prism structure of the pneumatic cylinder is controlled by controlling the fluid pressure within the pneumatic cylinder.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Rack: As used in this disclosure, a rack is a structure that holds or supports and object in a visible or exposed manner.

Rhombus: As used in this disclosure, a rhombus is a type of quadrilateral. The rhombus forms an enclosed two dimensional structure. The rhombus has four edges of equal length. The opposite internal angles of the vertices of the rhombus are equal. A diamond shape is considered a rhombus.

Rigid Structure: As used in this disclosure, a rigid structure is a solid structure formed from an inelastic material that resists changes in shape. A rigid structure will permanently deform as it fails under a force. See bimodal flexible structure.

Ring: As used in this disclosure, a ring is term that is used to describe a disk-like structure through which an aperture is formed. Rings are often considered loops.

Roller: As used in this disclosure, a roller is rotating cylindrical or disk structure used to reduce the friction of movement of an object supported by the roller. A roller will often change the direction of a cord or sheeting.

Roughly: As used in this disclosure, roughly refers to a comparison between two objects. Roughly means that the difference between one or more parameters of the two compared objects are not significantly different.

Scissor Jack: As used in this disclosure, a scissor jack refers to the style of type of lift or jack. The scissor jack is used to elevate a load above a supporting surface. The scissor jack comprises four prism-shaped legs of equal length and four pivots used to interconnect the four prism-shaped legs. Any first congruent end of any first prism-shaped leg selected from the four prism-shaped legs of equal length attaches to a first congruent end of a second prism-shaped leg selected from the four prism-shaped legs of equal length using a first pivot selected from the four pivots. The first pivot attaches the first prism-shaped leg to the second prism-shaped leg such that the first prism-shaped leg rotates relative to the second prism-shaped leg. A second pivot selected from the four pivots attaches the second congruent end of the first prism-shaped leg to a first congruent end of a third prism-shaped leg selected from the four prism-shaped legs of equal length such that the first prism-shaped leg rotates relative to the third prism-shaped leg. The third pivot selected from the four pivots interconnect the second prism-shaped leg and the fourth prism-shaped leg in a similar manner to that described above. The fourth pivot selected from the four pivots interconnect the third prism-shaped leg and the fourth prism-shaped leg in a similar manner to that described above. The assembled scissor jack forms a rhombus shaped structure with interior vertex angles that rotate as the scissor jack lifts a load. A first set of two opposite pivots selected from the four pivots align with the direction of lift of the scissor jack. The second set of two opposite pivots align perpendicularly with the direction of lift of the scissor jack. The elevation of the lift provided by the scissor jack in the direction of the first set of two opposite pivots is a function of the span of the distance maintained between the second set of two opposite pivots. The span of the distance between the second set of two opposite pivots is typically controlled using a spacing structure selected from the group consisting of a worm drive, a pneumatic cylinder, and a hydraulic cylinder. When multiple scissor jack structures are simultaneously used to form a single lift structure, the convention is to name the lift after the number of scissor jacks used to build the single lift structure. For example, a single lift structure formed from two scissor lifts is called a double scissor lift, and a single lift structure formed from three scissor lifts is called a triple scissor lift.

Semi-Enclosed Prism: As used in this disclosure, a semi-enclosed prism is a prism-shaped structure wherein a portion of the lateral face of the prism-shaped is removed or otherwise replaced with a negative space. Always use negative space.

Slot: As used in this disclosure, a slot is a prism-shaped negative space formed as a groove or aperture that is formed in or through an object.

Slotted Plate: As used in this disclosure, a slotted plate is a disk-shaped structure that has a disk-shaped negative space formed through the congruent ends of the disk-shaped structure. A nut is an example of a slotted plate. The negative space formed through the disk-shaped structure often has an elliptical shape that allows the position of the slotted plate to be adjusted as the slotted plate is attached to an object.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load of the object is transferred. This disclosure assumes that an object placed on the supporting surface is in an orientation that is appropriate for the normal or anticipated use of the object.

Swivel: As used in this disclosure, a swivel is a fastening structure that attaches a first object to a second object such that will rotate around an axis of rotation while the second object remains in a fixed position relative to the first object.

Vehicle: As used in this disclosure, a vehicle is a device that is used for transporting passengers, goods, or equipment. The term motorized vehicle specifically refers to a vehicle that can move under power provided by an electric motor or an internal combustion engine. The term vehicle generically applies to motorized vehicles and vehicles without a motor.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

Wheel: As used in this disclosure, a wheel is a circular object that revolves around an axle or an axis and is fixed below an object to enable it to move easily over the ground. For the purpose of this disclosure, it is assumed that a wheel can only revolve in a forward and a backward direction. Wheels are often further defined with a rim and spokes. Spokes are also commonly referred to as a wheel disk.

Worm Drive: As used in this disclosure, a worm drive refers to a mechanical arrangement where a rotating cylinder further comprising an exterior screw thread is used to: 1) rotate a gear; or 2) move a plate formed with an interior screw thread in a linear fashion in the direction of the center axis of the rotating cylinder. Worm drives are also referred to as worm gears.

Figure 6:
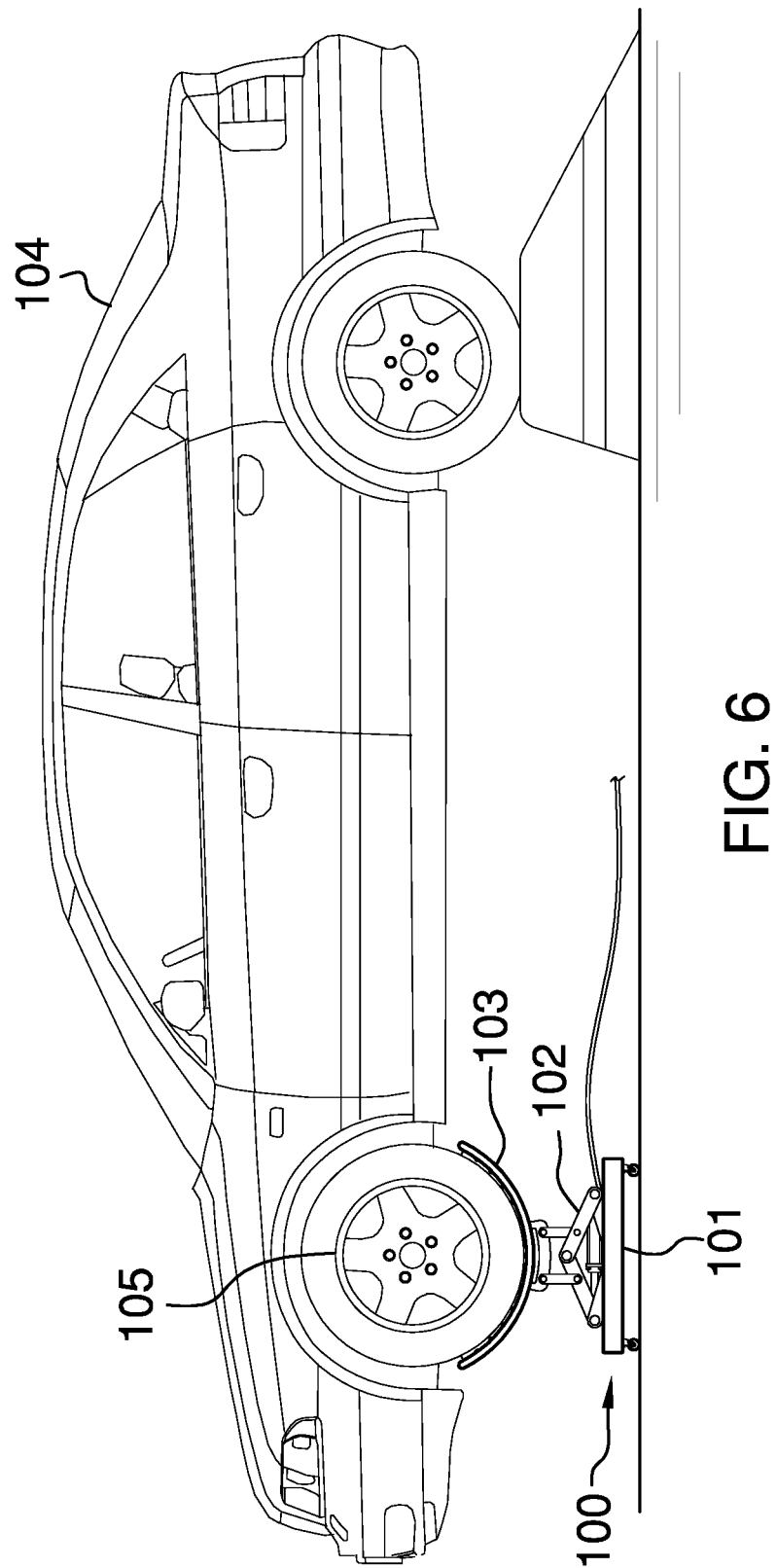
FIG. 6 is an in-use view of an embodiment of the disclosure.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A vehicle lift comprising:
    wherein the vehicle lift comprises a pedestal, a jack structure, and a wheel rack;
    wherein the jack structure attaches the wheel rack to the pedestal;
    wherein the vehicle lift is configured for use with a vehicle;
    wherein the vehicle further comprises a wheel;
    wherein the wheel is a disk-shaped structure;
    wherein the wheel rack is configured to receive the wheel;
    wherein the vehicle lift forms a jack used to elevate the vehicle such that the wheel of the vehicle can be removed and replaced;
    wherein the vehicle lift is a portable structure;
    wherein the vehicle lift is a rolling structure;
    wherein the vehicle lift is a non-Euclidean structure such that the wheel targeted for replacement can roll onto the vehicle lift;
    wherein a span of a length of the jack structure in a vertical direction adjusts such that the jack structure controls an elevation of the wheel rack above a supporting surface;
    wherein the wheel rack comprises a wheel disk, an axle plate, and a mounting structure;
    wherein the axle plate further comprises an axle disk and an axle notch;
    wherein the axle disk forms a physical instantiation of the wheel disk;
    wherein the axle disk is a rigid plate structure;
    wherein the axle disk has an irregular prism shape;
    wherein the axle disk forms a disk structure;
    wherein the axle disk is constructed to bear a load of the vehicle when the wheel of the vehicle is installed onto or removed from the vehicle;
    wherein the axle notch is a negative space that is formed into a superior lateral face of the prism irregular structure of the axle disk;
    wherein the axle notch is sized to receive an axle associated with the wheel of the vehicle
    wherein the axle notch is receives the load of the vehicle while the wheel of the vehicle is installed onto or removed from the vehicle.

2. The vehicle lift according to claim 1
    wherein the pedestal is a mechanical structure;
    wherein the pedestal is a rolling structure;
    wherein the pedestal provides a gripping structure that allows the vehicle lift to be lifted and carried;
    wherein the pedestal forms an inferior structure of the vehicle lift;
    wherein the pedestal forms a final link of a load path that transfers the load of the vehicle lift and the vehicle to the supporting surface.

3. The vehicle lift according to claim 2
    wherein the jack structure is a mechanical structure;
    wherein the jack structure forms a jack that elevates the wheel of the vehicle above the supporting surface;
    wherein the jack structure forms a load path that transfers the load of the wheel rack and the vehicle to the supporting surface.

4. The vehicle lift according to claim 3
    wherein the wheel rack is a mechanical structure;
    wherein the wheel rack has a prism shape;
    wherein the wheel rack is formed as a semi-enclosed prism structure;
    wherein the wheel rack is formed as a semi-enclosed pan structure.

5. The vehicle lift according to claim 4
    wherein the pedestal comprises a pedestal frame and a plurality of pedestal casters;
    wherein each of the plurality of pedestal casters attaches to the pedestal frame;
    wherein the jack structure comprises a double scissor jack and a spacing structure;
    wherein the spacing structure attaches to the double scissor jack;
    wherein the axle plate rigidly attaches to the wheel disk;
    wherein the wheel rack attaches to the double scissor jack by attaching the wheel disk to the double scissor jack;
    wherein the wheel disk attaches to the double scissor jack such that the wheel disk rotates relative to the double scissor jack.

6. The vehicle lift according to claim 5
    wherein the pedestal frame is a mechanical structure;
    wherein the pedestal frame is a rigid structure;
    wherein the pedestal frame has a disk shape;
    wherein the pedestal frame has a ring structure.

7. The vehicle lift according to claim 6
wherein each of the plurality of pedestal casters is a rolling structure;
wherein each of the plurality of pedestal casters attaches to an inferior congruent end of the disk structure of the pedestal frame;
wherein each of the plurality of pedestal casters attaches to the pedestal frame such that the pedestal will roll freely over the supporting surface;
wherein each of the plurality of pedestal casters is a locking structure.

8. The vehicle lift according to claim 7
wherein the double scissor jack is a mechanical structure;
wherein the double scissor jack forms a framework that attaches the wheel rack to the pedestal;
wherein the double scissor jack is a rotating structure;
wherein the double scissor jack rotates such that the elevation of the wheel rack relative to the pedestal is adjustable;
wherein the double scissor jack adjusts the span of the length of the elevation of wheel rack relative to the pedestal by rotating elements of the double scissor jack relative to each other.

9. The vehicle lift according to claim 8
wherein the spacing structure is a mechanical structure;
wherein the spacing structure attaches to the double scissor jack;
wherein the spacing structure adjusts the elevation of the double scissor jack;
wherein the spacing structure rotates rotating elements of the double scissor jack relative to each other to adjust the elevation of the double scissor jack.

10. The vehicle lift according to claim 9
wherein the double scissor jack comprises a first scissor jack and a second scissor jack;
wherein the first scissor jack is a mechanical structure known as a scissor jack;
wherein the first scissor jack forms a portion of the load path formed by the double scissor jack;
wherein the first scissor jack physically raises and lowers the elevation of the wheel rack relative to the pedestal;
wherein the first scissor jack physically attaches to the spacing structure such that a change in the span of the length of the spacing structure changes the elevation provided by the first scissor jack;
wherein the second scissor jack is a mechanical structure known as a scissor jack;
wherein the second scissor jack forms a portion of the load path formed by the double scissor jack;
wherein the second scissor jack physically raises and lowers the elevation of the wheel rack relative to the pedestal;
wherein the second scissor jack physically attaches to the spacing structure such that a change in the span of the length of the spacing structure changes the elevation provided by the second scissor jack.

11. The vehicle lift according to claim 10
wherein the first scissor jack is identical to the second scissor jack;
wherein the first scissor jack and the second scissor jack combine to form the double scissor jack;
wherein the first scissor jack attaches to the wheel disk of the wheel rack such that the wheel disk rotates relative to the first scissor jack;
wherein the second scissor jack attaches to the wheel disk of the wheel rack such that the wheel disk rotates relative to the second scissor jack.

12. The vehicle lift according to claim 11
wherein the spacing structure is a hydraulic cylinder;
wherein the hydraulic cylinder is a mechanical structure with a variable length;
wherein a motive forces of the hydraulic cylinder are provided by a pressurized fluid;
wherein the span of the length of the hydraulic cylinder is a function of the pressure of the fluid in the hydraulic cylinder;
wherein the elevation of the double scissor jack adjusts by adjusting the length of the hydraulic cylinder that forms the spacing structure.

13. The vehicle lift according to claim 12
wherein the wheel disk is a non-Euclidean disk structure;
wherein the non-Euclidean disk structure of the wheel disk is formed with a concave congruent end and a convex congruent end;
wherein the wheel disk is formed as a portion of the lateral face of the prism structure of the wheel rack;
wherein a shape of the concave congruent end of the non-Euclidean disk structure of the wheel disk corresponds to a shape of the wheel such that the wheel will roll into and fit in a containment structure formed by the wheel disk;
wherein the wheel disk forms the structure that elevates the wheel above the supporting surface.

14. The vehicle lift according to claim 13
wherein the axle plate is a rigid structure;
wherein the axle plate forms a congruent end of the disk structure of the wheel rack;
wherein the axle plate forms a closed face of the semi-enclosed pan structure formed by the wheel rack;
wherein the axle plate has an irregular prism shape;
wherein the axle plate rigidly attaches to the wheel disk such that the congruent ends of the irregular prism structure of the axle plate are perpendicular to the congruent ends of the non-Euclidean disk structure of the wheel disk;
wherein the congruent ends of the irregular prism structure of the axle plate are parallel to the force of gravity;
wherein the axle plate forms a vertically oriented boundary that guides the wheel onto the concave congruent end of the non-Euclidean disk structure of the wheel disk;
wherein the axle plate forms a mechanical structure that supports the axle associated with the wheel such that the load of the vehicle transfers into the vehicle lift through the axle plate as the wheel is installed onto or removed from the vehicle.

15. The vehicle lift according to claim 14
wherein the mounting structure is a mechanical structure;
wherein the mounting structure is a fastening structure;
wherein the mounting structure attaches the wheel disk of the wheel rack to a superior end of the double scissor jack;
wherein the mounting structure attaches the wheel disk to the double scissor jack such that the wheel disk rotates relative to the double scissor jack.

16. The vehicle lift according to claim 15
wherein the mounting structure comprises a first jack mount and a second jack mount;
wherein the first jack mount is a mechanical structure;
wherein the second jack mount is a mechanical structure;

wherein the first jack mount attaches the first scissor jack to the wheel disk;
wherein the first jack mount attaches the first scissor jack to the wheel disk such that the wheel disk rotates relative to the first scissor jack;
wherein the second jack mount attaches the second scissor jack to the wheel disk;
wherein the second jack mount attaches the second scissor jack to the wheel disk such that the wheel disk rotates relative to the second scissor jack.

17. The vehicle lift according to claim 16
wherein the first jack mount attaches the superior end of the first scissor jack to the convex congruent end of the wheel disk;
wherein the first jack mount attaches the superior end of the first scissor jack to the wheel disk such that the wheel disk rotates relative to the first scissor jack;
wherein the first jack mount comprises a first slotted plate, a first pivot bar, and a second pivot bar;
wherein the first slotted plate is an irregular prism-shaped structure;
wherein the first slotted plate has a disk structure;
wherein the first slotted plate attaches to the convex congruent end of the non-Euclidean disk structure of the wheel disk;
wherein the first slotted plate attaches to the wheel disk such that the congruent ends of the irregular disk structure of the first slotted plate are perpendicular to the convex congruent end of the non-Euclidean disk structure of the wheel disk;
wherein a portion of the lateral face of the disk structure of the first slotted plate defines a shape that corresponds to the shape of the convex congruent end of the non-Euclidean disk structure of the wheel disk such that the first slotted plate mounts flush against the wheel disk;
wherein the first slotted plate comprises a first irregular disk structure and a first non-Euclidean slot structure;
wherein the first irregular disk structure refers to a plate that forms the disk structure of the first slotted plate;
wherein the lateral face of the first irregular disk structure physically attaches to the convex congruent end of the wheel disk;
wherein the first non-Euclidean slot structure refers to the negative space that is formed through the congruent ends of the disk structure of the first irregular disk structure that forms the disk-shaped negative space through the first irregular disk structure that is characteristic of a slotted plate;
wherein the first irregular disk structure attaches to the wheel disk such that the position of the first irregular disk structure relative to the wheel disk adjusts as the wheel disk rotates relative to the first scissor jack;
wherein the first pivot bar is a rigid disk-shaped structure;
wherein the first pivot bar attaches the superior end of the first scissor jack to the first irregular disk structure of the first slotted plate;
wherein the first pivot bar attaches to the superior end of the first scissor jack such that the first pivot bar rotates relative to the first scissor jack;
wherein the first pivot bar attaches to the first irregular disk structure such that the first pivot bar rotates relative to the first irregular disk structure;
wherein the second pivot bar is a rigid disk-shaped structure;
wherein the second pivot bar attaches the superior end of the first scissor jack to the convex congruent end of the non-Euclidean disk structure of the wheel disk of the wheel rack;
wherein the second pivot bar attaches to the superior end of the first scissor jack such that the second pivot bar rotates relative to the first scissor jack;
wherein the second pivot bar attaches to the convex congruent end of the non-Euclidean disk structure of the wheel disk such that the second pivot bar rotates relative to the wheel disk.

\* \* \* \* \*